United States Patent [19]

Gary et al.

[11] Patent Number: 5,633,975

[45] Date of Patent: May 27, 1997

[54] SECURITY SYSTEM RESPONSIVE TO OPTICAL FIBER HAVING BRAGG GRATING

[75] Inventors: Charles K. Gary, Palo Alto; Meric Ozcan, Sunnyvale, both of Calif.

[73] Assignee: The United States of America as represented by the Administrator of the National Aeronautics and Space Administration, Washington, D.C.

[21] Appl. No.: 572,396

[22] Filed: Nov. 14, 1995

[51] Int. Cl.$^6$ .................................................. G02B 6/124
[52] U.S. Cl. ........................... 385/147; 385/37; 385/12; 385/38; 70/DIG. 46; 250/227.14
[58] Field of Search ............................... 385/147, 37, 16, 385/15, 38, 12; 250/227.14, 556; 356/71; 70/277, 278, DIG. 51, DIG. 46

[56] References Cited

U.S. PATENT DOCUMENTS

| | | | |
|---|---|---|---|
| 3,728,521 | 4/1973 | Borough et al. | 235/61.112 |
| 3,733,862 | 5/1973 | Killmeyer | 70/277 |
| 3,769,514 | 10/1973 | Clark, Jr. | 250/341 |
| 3,797,936 | 3/1974 | Dimitriadis | 356/71 |
| 4,079,605 | 3/1978 | Bartels | 70/277 |
| 4,286,305 | 8/1981 | Pilat et al. | 361/172 |
| 4,369,481 | 1/1983 | Early | 361/173 |
| 4,447,123 | 5/1984 | Page et al. | 350/96.24 |
| 4,725,110 | 2/1988 | Glenn et al. | 350/3.61 |
| 5,351,324 | 9/1994 | Forman | 385/37 |

*Primary Examiner*—Phan T. H. Palmer
*Attorney, Agent, or Firm*—Kenneth L. Warsh; Harry Lupuloff; John G. Mannix

[57] ABSTRACT

An optically responsive electronic lock is disclosed comprising an optical fiber serving as a key and having Bragg gratings placed therein. Further, an identification system is disclosed which has the optical fiber serving as means for tagging and identifying an object. The key or tagged object is inserted into a respective receptacle and the Bragg gratings cause the optical fiber to reflect a predetermined frequency spectra pattern of incident light which is detected by a decoder and compared against a predetermined spectrum to determine if an electrical signal is generated to either operate the lock or light a display of an authentification panel.

10 Claims, 5 Drawing Sheets

SECURITY SYSTEM RESPONSIVE TO OPTICAL FIBER HAVING BRAGG GRATING

ORIGIN OF THE DISCLOSURE

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

1. Technical Field of the Invention

The present invention relates to a security system comprising an optical fiber serving as a key and having a Bragg gratings that provide for reflected light with a predetermined frequency spectrum which is detected and compared by a decoder to control the locking/unlocking of a locking mechanism.

2. Description of the Prior Art

Security systems comprising light sources, optical fibers having Bragg gratings, and electronic devices to detect for the predetermined frequency spectra reflected by the Bragg gratings are known, and one such system is described in U.S. Pat. No. 5,351,324 ('324), herein incorporated by reference. The '324 patent discloses an optical fiber placed in a container and located along the seals of the container so that if any one of the seals is disturbed or broken, the optical fiber is correspondingly disturbed or broken and its reflected frequency spectra is altered which is detected by the electronic devices to ascertain a security breach. The '324 patent, although serving well the needs of security for a container, does not address the needs of other users, such as an electronic lock used for industrial and domestic purposes and operated by an associated key.

Security systems using optical devices are also known and some of which are described in U.S. Pat. Nos. 4,079,605 ('605) and 4,369,481 ('481) and both of which are herein incorporated by reference. The '605 patent uses a card device to operate an electronic lock, whereas the '481 patent uses a key having reflective surfaces to operate an electronic lock. Whereas the card of the '605 patent is convenient in many ways, it does have a drawback in that it must be kept on person, such as in the wallet, and thus may be misplaced (not on the person) when actually needed. The key of the '481 patent although not normally being subjected to being misplaced, does have a drawback in that it requires the complementary lock receptacle to coact with light reflected off the surfaces of the key. This coaction limits one key to one receptacle, thereby, preventing one key to be used for multiple applications. It is desired that other types of key means be employed for optically operated electronic locks that allows for greater flexibility and convenience in their usage.

Accordingly, it is a primary object of the present invention to provide a key for optically responsive electronic locks that is convenient to use for multiple applications and which is not susceptible to being misplaced so that it may be used when needed.

It is yet another object of the present invention to provide a key for an optically responsive electronic lock that is formatted into unique patterns that are not easily duplicated, yet are easily verifiable for identification purposes.

It is still further an object of the present invention to provide for an optically responsive electronic lock having decode means that are commercially available so that the associated lock may be more economically acceptable by the industrial and domestic users.

SUMMARY OF THE INVENTION

The present invention is directed to a security system comprising an electronic lock having means that are responsive to a fiber optic serving as a key thereof.

The security system comprises a light source, a receptacle, a key, and a decoder. The light source has means for providing light along a predetermined path. The receptacle has a mouth with predetermined dimension and a passageway with entrance and exit portions and located to intercept the light. The key comprises a carrier and a fiber optic. The carrier has an external portion with dimensions complementary to the exit portion of the passageway and the fiber optic is located in the carrier to intercept the light at the exit portion of the passageway. The fiber optic has at least one reflective Bragg grating that reflects the intercepted light into a predetermined spectral pattern. The decoder has means for receiving and decoding the reflected predetermined spectral pattern and compares and generates an electrical signal when the predetermined spectral pattern matches a preselected pattern.

DETAILED DESCRIPTION OF THE PREFERRED EMBODIMENTS

Figure 1:
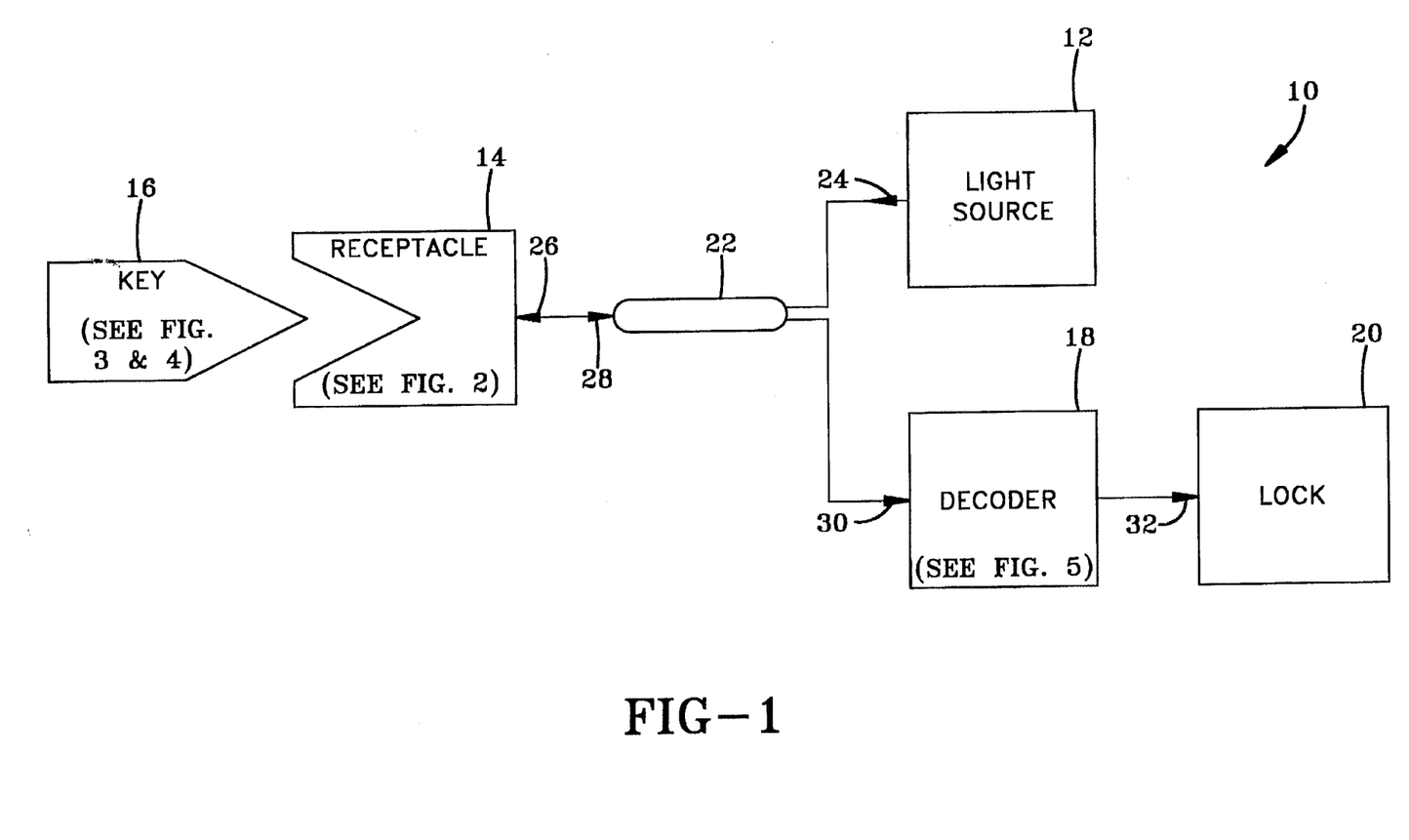
FIG. 1 is a block diagram of the optical responsive electronic lock of the present invention.

With reference to the drawings, wherein the same numerals indicate the same elements throughout, there is shown in FIG. 1 a block diagram of the optically responsive electronic lock 10 of the present invention. The electronic lock 10 is responsive to a light source 12 and comprises a receptacle 14 that accepts a key 16 having at least one Bragg grating therein with a known frequency spectra created by reflecting incident light generated by the light source 12 which is detected by the decoder 18 and compared against a predetermined spectrum and, if the comparison agrees, generates an electrical signal which, in turn, unlocks the lock 20. The electronic lock 10 further comprises a coupler 22, known in the field, for transferring and directing light among the light source 12, the receptacle 14, and the decoder 18.

In general, the light source 12 generates light which is conveyed in the direction indicated by arrow 24 to the optical coupler 22 which, in turn, directs the light in the direction indicated by arrow 26 to the receptacle 14. The receptacle 14, in cooperation with the key 16, reflects light in the direction indicated by arrow 28 back to the coupler 22 which, in turn, directs the light, as indicated by arrow 30, to the decoder 18. The decoder 18 decodes the reflected light and if the reflected light is proper, that is, it has a predetermined spectra pattern, the decoder 18 provides an electrical signal to the lock 20 in the direction indicated by arrow 32.

The light source 12 preferably comprises a semiconductor device, such as a light-emitting diode that emits visible or infrared light when forward biased. The light source 12 emits broad band light that is directed along a predetermined path to the receptacle 14 which may be further described with reference to FIG. 2.

Figures 2, 3:
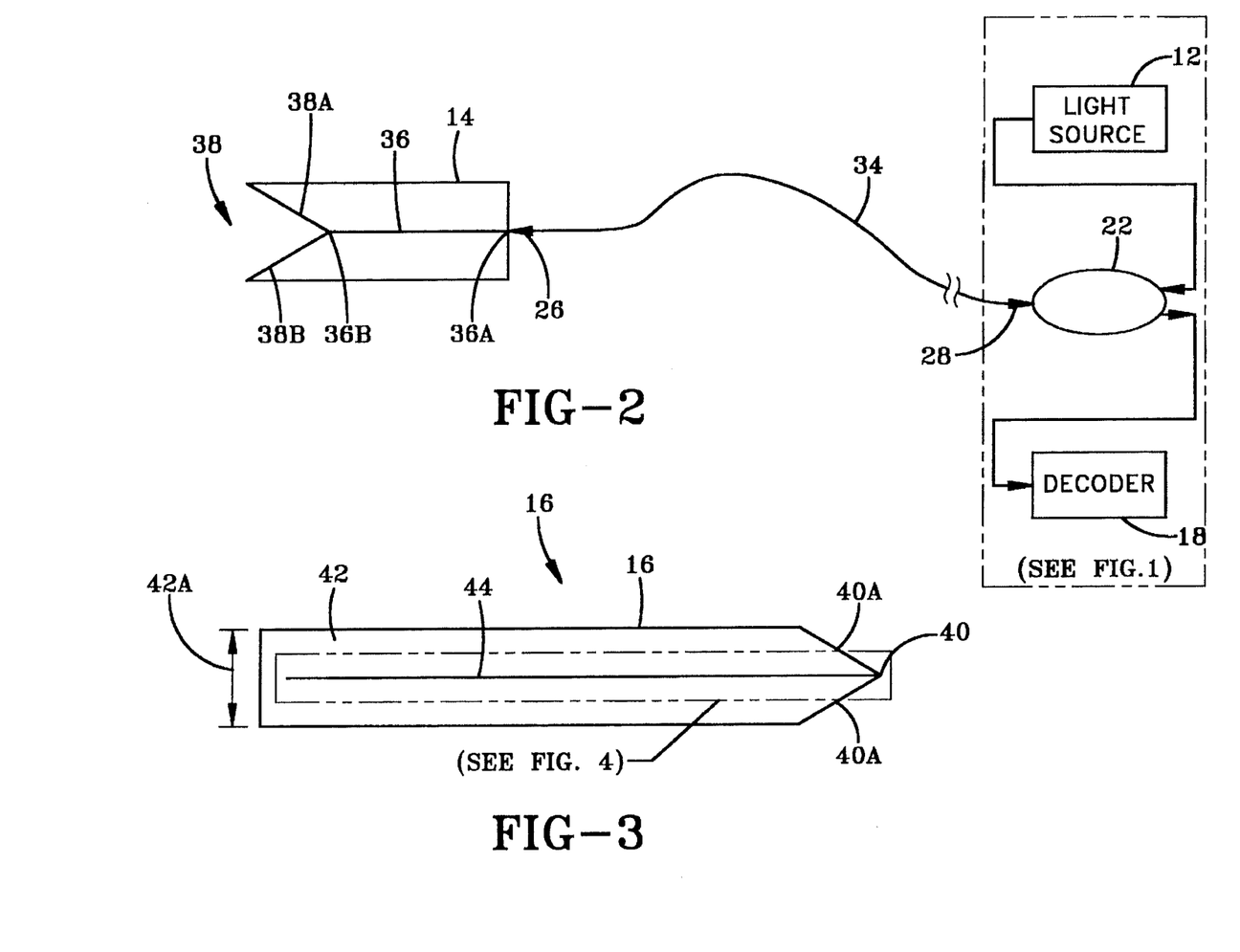
FIG. 2 illustrates the general features of the receptacle of the present invention.
FIG. 3 illustrates the general features of the key of the present invention.

As seen in FIG. 2, the light from the light source 12 is directed from the coupler 22 to the receptacle 14 by way of a conventional fiber cable 34 which confines the light to the predetermined path. The receptacle 14 has a passageway 36 for conveying light, with an entrance portion 36A and an exit portion 36B. The passageway 36 is located so as to intercept the light emitted from light source 12 and flowing out of fiber cable 34 in a direction indicated by arrow 26. The receptacle 14 has a mouth 38 with predetermined dimensions and in one embodiment includes oppositely sloped sidewalls 38A and 38B. The mouth 38 may have other configurations so long as its predetermined dimensions are complementary to those of the key 16 which may be further described with reference to FIG. 3.

As seen in a comparison between FIGS. 2 and 3, the key 16 has a head 40 with oppositely sloped sidewalls 40A and 40B which are complementary to sloped sidewalls 38A and 38B, respectively, of mouth 38. The head 40 is actually a part of a carrier 42 which has lodged therein a fiber optic 44 located so as to intercept light at the exit portion of the passageway 36B of receptacle 14 when the head 40 of the carrier 42 is inserted into the mouth 38 of the receptacle 14. The fiber optic 44 is a relatively thin device having a typical diameter of 125 micrometers and extremely small, as little as 0.01 cm$^3$. The fiber optic 44 because of its small and fragile nature, and its need to serve somewhat rugged use, is preferably encased in the carrier 42 to provide protection thereof and to serve as a rugged key 16.

The carrier 42 may be comprised of metal and have a diameter 42A, as shown in FIG. 3, of approximately two millimeters. The carrier 42 having the optic fiber 44 lodged therein may be of any shape, allowing it to take the form of everyday objects, such as a tie clip, pen, jewelry or any other object that is normally kept on the person. The key 16, comprising the carrier 42 and fiber optic 44, may be more readily fastened, or become a more or less natural part of a person's everyday attire, so as to avoid the misplacement problem discussed in the "Background" section for a conventional card serving as a key device. Furthermore, the key 16 is much easier to conceal than magnetic cards or large reflective optical surfaces serving as key devices which are usually removed from the clothing of a person as soon as possible because of their somewhat bulky and inconvenient physical characteristics. The fiber optic 44, unlike bulky devices, because of its relatively small dimensions would be placed by itself, or an appropriate carrier, into a wristwatch thereby further assuring its availability when needed. The optic fiber 44 may be further described with reference to FIG. 4.

Figure 4:
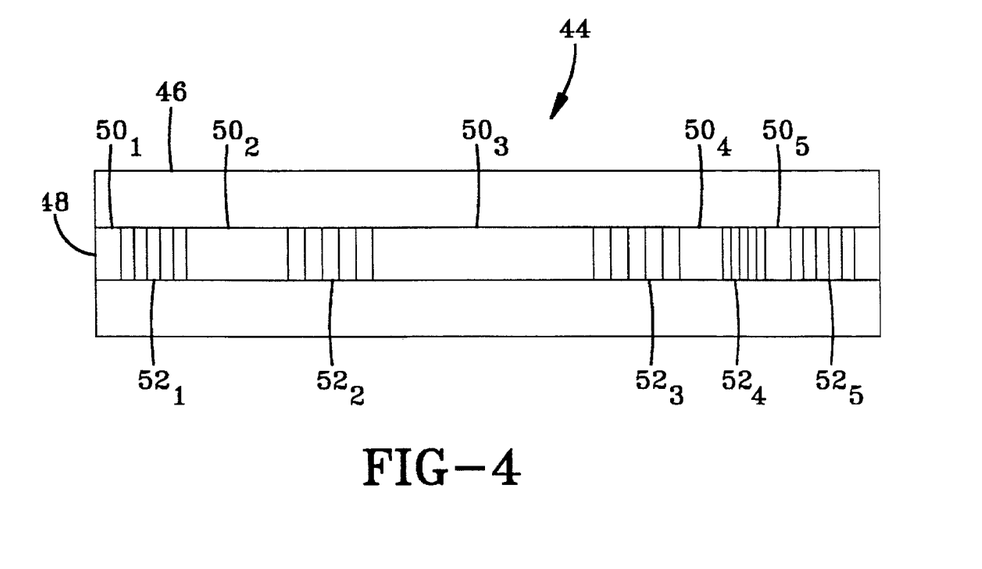
FIG. 4 illustrates details of the fiber optic embedded in the key of FIG. 4.

The optic fiber 44 comprises cladding 46 that is placed on a core 48. The core 48 comprises zones $50_1$, $50_2$, $50_3$, $50_4$, and $50_5$ which have smooth surfaces and are devoid of any Bragg gratings and provide for zero spectra lines, whereas zones $52_1$, $52_2$, $52_3$, $52_4$, $52_5$ of core 48 do have Bragg gratings and provide for predetermined spectral lines so as to provide for a predetermined reflective spectra pattern. The Bragg gratings $52_1$, $52_2$, $52_3$, $52_4$, and $52_5$ may be placed into the core 48 in any known manner, such as the procedure for inducing optical gratings, more fully described in U.S. Pat. No. 4,725,110, herein incorporated by reference.

Figure 5:
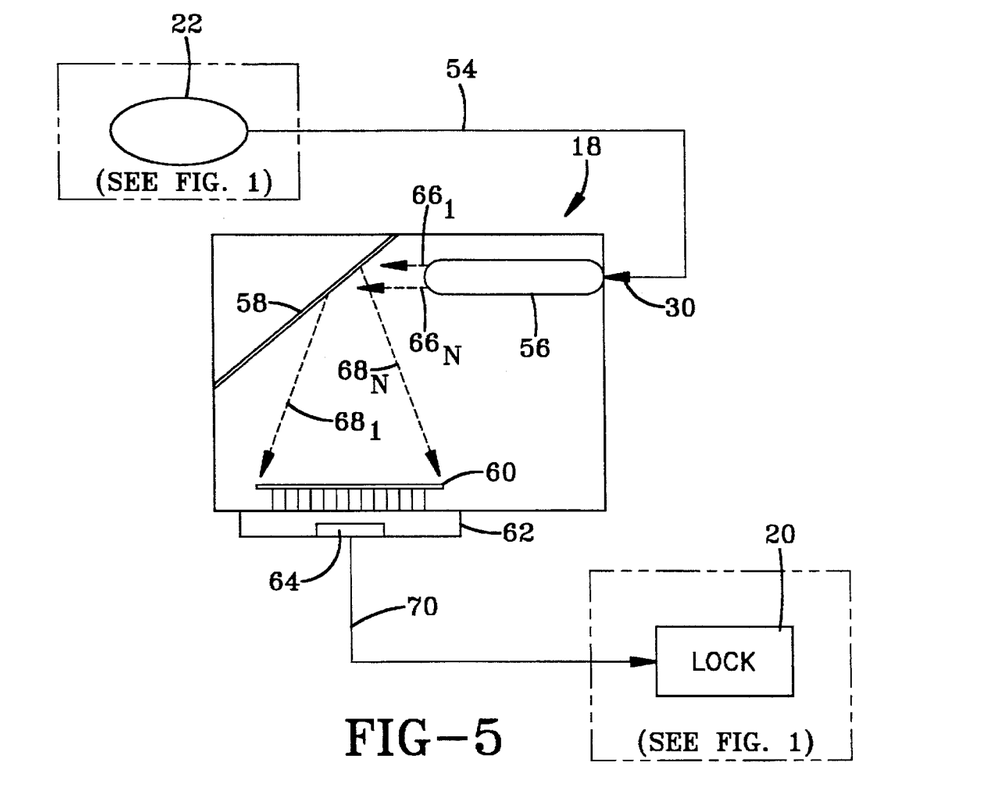
FIG. 5 illustrates one embodiment of the decoder of the present invention.

The core 48 having a Bragg grating such as $52_1$, $52_2$, $52_3$, $52_4$, or $52_5$, as well known in the art, is treated as a special optical fiber whose index of a fraction changes periodically. The Bragg gratings $52_1$, ... $52_5$, reflect light at a frequency corresponding to the period of the index of refraction changes. By placing many Bragg gratings, such as $52_1$ ... $52_N$, in a serial arrangement, the light from the light source 12 that the core 48 intercepts as the light emanates from the exit portion 36B of receptacle 14, is reflected as light consisting of multiple spectral lines corresponding to the wavelength of the individual Bragg gratings $52_1$ ... $52_5$. Such an arrangement allows for a binary number to be placed in the key 16, more particularly, core 48 by the presence or absence of each of a sequence of spectral lines. The coded core 48 reflects light, originated from light source 12, back to the coupler 22 which, in turn, as seen in FIG. 5, is conveyed back to the decoder 18 via the optical fiber 54. The decoder 18 may be further described with reference to FIG. 5 illustrating a plurality of elements given in Table 1.

TABLE 1

| REFERENCE NO. | ELEMENT |
| --- | --- |
| 56 | COLLECTING OPTICS |
| 58 | DIFFRACTION GRATING OPTICS |
| 60 | LINEAR DETECTOR ARRAY |
| 62 | CONTROL ELECTRONICS |
| 64 | SOLENOID |

The collecting optics 56, in a manner known in the art, receive and focus the reflected predetermined spectra that has been generated by the coded core 48 into a beam comprising light rays $66_1$ ... $66_N$ that is directed toward the diffraction grating optics 58.

The diffraction grating optics 58, may be those such as known in the art, comprising a transparent plate containing a plurality of parallel lines, grooves or slits. The light rays $66_1$ ... $66_N$ pass through, for example, the slits and produce a spectrum as a result of interference patterns and which spectrum is comprised of light rays $68_1$ ... $68_N$, each of a known wavelength, which strike the linear detector array 60.

Each of the light rays $68_1$ ... $68_N$ diffracted from the diffraction grating optics 58 is at a unique angle so that the spectra lines of the light $68_1$ ... $68_N$ created by the coded core 48 reflecting the light generated by the light source 12, all strike or impinge the linear detector array 60 at unique locations. In a manner known in the art, the linear detector array 60 produces an electrical signal at those impinged locations where light is present, thus, an electrical signal is generated for each spectral line present in the key, more particularly, created by the Bragg gratings $52_1$ ... $52_N$ of the coded core 48. Each of the generated electrical signals may be representative by a binary bit so that the cumulative output of the linear detector array 60 represents a binary number (digital word). The linear detector array 60 produces the binary number that is routed to the control electronics 62.

The control electronics 62 comprises a comparison means for comparing the binary number of the linear detector array 60 against a preselected pattern, represented by a binary number, and generates an electrical signal when the binary output signal matches the preselected pattern. The electrical signal (not shown) is directed to a solenoid 64.

The solenoid 64 may be of the conventional type, such as that described in the previously mentioned U.S. Pat. No.

4,369,481. The solenoid 64 controls the electronic lock 20, via path 70, allowing it to be moved into a latched or unlatched position which, in turn, allows for an associate door, or other security device being serviced by the lock 20, to be opened or closed in a manner known in the art. Although solenoid 64 serves well its intended function, the electrical signal generated by the control electronics 62 can be used to drive other locking mechanisms, including things other than solenoids, such as piezoelectric devices.

Figure 6:
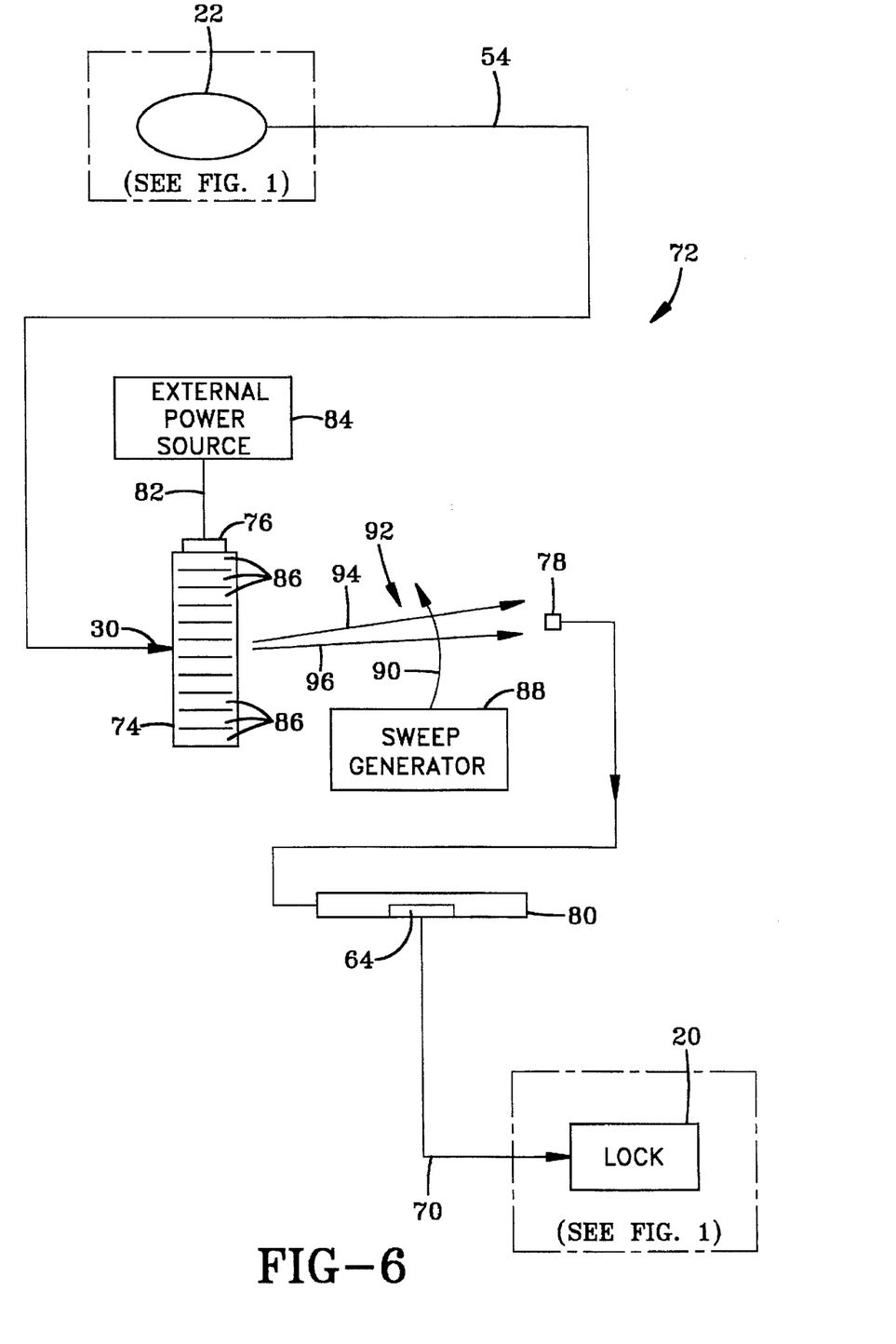
FIG. 6 illustrates another embodiment of the decoder of the present invention.

An alternate embodiment of a decoder 72 that employs acoustical optic devices is illustrated in FIG. 6 and comprises a plurality of elements given in Table 2.

TABLE 2

| REFERENCE NO. | ELEMENT |
| --- | --- |
| 74 | ACOUSTOOPTIC CRYSTAL |
| 76 | ELECTROACOUSTIC TRANSDUCER |
| 78 | PHOTODETECTOR |
| 80 | CONTROL ELECTRONICS |

The acoustooptic crystal 74 is arranged to intercept the predetermined spectrum pattern reflected by the coded core 48, but to allow this pattern to find its way through the acoustooptic crystal 74. An electrical signal 82, from an external power source 84, is converted to an ultrasonic vibration 86, illustrated by vertical bars representative of an acoustic wave within the acoustooptic crystal 74, by the transducer 76. As the predetermined spectrum pattern passes through the acoustic wave 86, it is diffracted with an angle determined by the product of the wavelength (frequency) of the predetermined spectrum pattern and the frequency of the acoustic wave 86. The electrical, and thus acoustic, frequency is swept by means of a sweep generator 88, known in the art, in a direction indicated by directional arrow 90 through a range so that at given points in time, each wavelength of input light spectrum 92, shown in FIG. 6 by arrows 94 and 96 exiting from the acoustooptic crystal 74, is diffracted and directed to the photodetector 78. This diffraction produces a voltage on the photodetector 78 that varies in time with the same pattern as the predetermined spectrum pattern applied to the decoder 72, via the fiber cable 54. The time varying signal may serve as a binary output signal similar to that produced by the linear detector array 60 of FIG. 5. The sweep time of the sweep generator 88 for the full frequency of the light spectrum 92 is typically 100 milliseconds or less, so that once the key 16 of FIG. 3 is inserted into the receptacle 14 of FIG. 2 it is unlikely to be removed before proper identification can be made by the embodiment of FIG. 6, having the photodetector 78 which generates a time varying signal that is applied to the control electronic 80.

Control electronics 80 converts the time varying signal to a digital code for the key 16 in the same way that the control electronics 62 of FIG. 5 converts the output of the linear detector array 60 to a digital code. The control electronics 80 generates an electrical which is routed to the solenoid 64 which, via signal path 70, controls the lock 20. The solenoid 64 and the lock 20 operates in a manner as previously described with reference to FIG. 5.

OPERATION OF THE OPTICALLY RESPONSIVE ELECTRONIC LOCK OF THE PRESENT INVENTION

The optically responsive electronic lock 10 of FIG. 1 is rendered operative by first inserting the key 16 into the receptacle 14. The coded core 48 (see FIG. 4) of the key 16 intercepts the light generated by light source 12 and exiting the exit portion 36B of receptacle 14 (see FIG. 2). The coded core 48, having the preselected Bragg gratings, reflects the incident light into a predetermined spectra pattern which is compared by either the decoder 18 of FIG. 5 or the decoder 72 of FIG. 6. The decoder 18 or 72 has a prestored binary number representative of a preselected spectra pattern to which the decoder 18 or 72 compares the predetermined spectra pattern created by the coded core 48. If the reflected predetermined spectra pattern agrees with the preselected spectra pattern then the contents of the key 16 is authenticated which, in turn, causes the decoder 18 or 72 to generate an electrical signal which operates a solenoid which, in turn, unlocks the lock 20.

The Bragg gratings of the coded core 48 may be selected to provide numerous (e.g., 65,536) identification codes. The coded core 48, more exactly the fiber optic 44 of FIG. 4, because of its small size may be conveniently housed by the carrier 42 (see FIG. 3). The carrier 42, in turn, may be conveniently shaped to more readily accommodate the usage of the key 16. For example, the carrier 42 may be formed as part of a tie clip or pen. This is normally more easily carried by a user and therefore are less susceptible to being misplaced and more likely to be available when needed.

The fiber optic 44 because of its multiple identification codes may be selectively formatted to accommodate and activate multiple locks for various security applications. Further, the fiber optic 44 because of its relatively small dimensions is not easily duplicated which further enhances its security parameters.

Because of the fiber optic 44 capability to operate multiple locks and because a single lock can be operated by multiple fiber optics 44, one arrangement of the fiber optic 44 may easily serve as a master key that operates on a group of locks, while other arrangements of the fiber optic 44 serve as a key that operates just one of the locks of the group.

Figure 7:
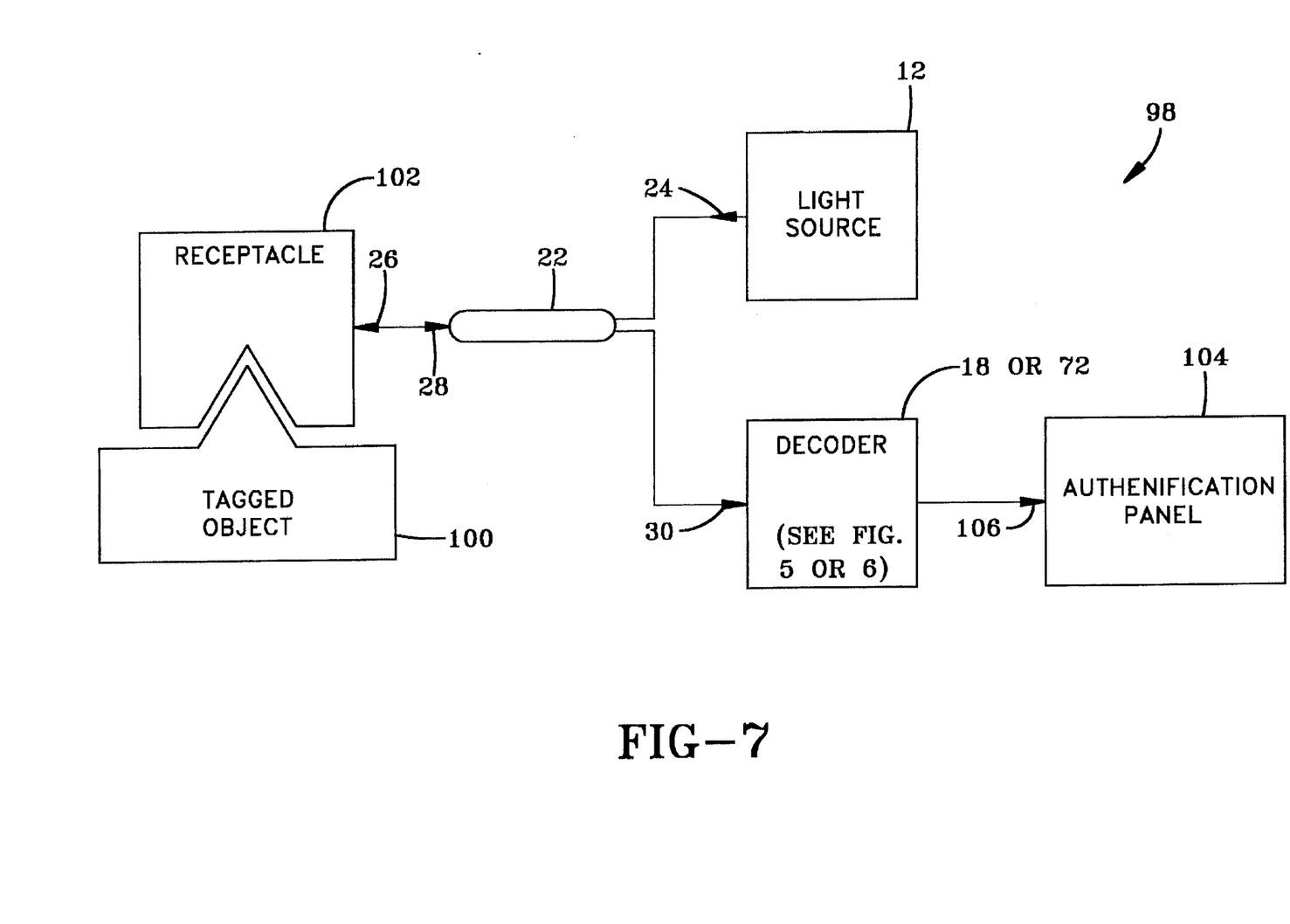
FIG. 7 is a block diagram of an identification system of the present invention.

Although the previously given description has been primarily related to a security system operating locks, the present invention is equally applicable to an identification system 98 that may be further described with reference to FIG. 7.

The identification system 98 includes elements 12, 18, 22 and 72 and the informational exchange indicated by directional arrows 24, 26, 28 and 30 all of which have been previously described with reference to FIGS. 1–6. The identification system 98 further includes a tagged object 100, a receptacle 102 and an authentification panel 104 which is responsive to a signal routed in the direction indicated by arrow 106 and generated by either the decoder 18 or 72.

The identification system 98 operates in a manner quite similar to the security system 10 of FIG. 1, with the exception that instead of the fiber optic 44 of FIGS. 3 and 4 serving as the key 16 of FIG. 1, the fiber optic 44 serves as a tag for tagged object 100 to be identified and authenticated by system 98. For instance, the fiber optic 44 could be placed in expensive original products comprising the tagged object 100, such as limited edition lithographs to verify their identity. The tagged object 100 is then positioned to mate with the receptacle 102 with the exception that the physical features of the receptacle 102 needs to be selected to accommodate the mating of the tagged object 100.

The tagged object 100 and the receptacle 102 respectively operate in a manner as previously described for the key 16 and receptacle 14 of FIGS. 1–6. Furthermore, the selected decoders 18 and 72 operate in a manner as previously described for FIGS. 5 and 6, respectively, with the exception that the solenoid 64, or its equivalent, is no longer needed to operate a locking mechanism, but rather the selected decoder 18 or 72 now supplies an electrical signal that is routed in direction 106 to the authentication panel 104 which, in turn, may respond with an appropriate display to indicate the proper authentication.

It should now be appreciated that the practice of the present invention provides for an identification system as well as a security system both responsive to fiber optics that may be coded by means of Bragg gratings to provide for numerous identification codes that are not easily duplicated, yet are simply recognized.

It should be further appreciated that the fiber optics need only be conveniently inserted into a key, tagged object or some other insertable device that is matched with an appropriate receptacle and either authentification or security functions are performed by the practice of the present invention.

It should be still further appreciated that the fiber optics may be lodged into a convenient carrier, such as in the form of a tie clip pen or wristwatch, that is more readily available for use to operate an electronic lock.

Furthermore, it should be appreciated that the optical electronics for decoding the spectrum patterns created by the fiber optic are conventional in nature and therefore are readily available for the implementation of the system described herein and, therefore, may enter commerce more readily.

Further, although the invention has been described relatively to the specific embodiments thereof, it is not so limited and many modifications and variations thereof now will be readily apparent to those skilled in the art in light of the above teachings.

What we claim is:

1. A system comprising:
   (a) a light source having means for providing light along a predetermined path;
   (b) a receptacle having a mouth with predetermined dimensions and a passageway having entrance and exit portions, said passageway located so as to intercept said light;
   (c) a device insertable into said receptacle comprising;
      (i) a carrier having an external portion with dimensions complementary to said mouth of said receptacle, and
      (ii) a fiber optic located in said carrier so as to intercept said light at said exit portion of said passageway, said fiber optic having at least one reflective Bragg grating that reflects said intercepted light into a predetermined spectra pattern; and
   (d) a decoder having means for receiving and decoding said reflected predetermined spectra pattern and comparing and generating an electrical signal when said predetermined spectra pattern matches a preselected pattern.

2. The system according to claim 1, wherein said insertable device is a key.

3. The system according to claim 2 further comprising a solenoid switch that drives a locking device interconnected to a door and which solenoid is responsive to said electrical signal.

4. The system according to claim 1, wherein said insertable device is a tagged object.

5. The system according to claim 4 further comprising an authentification display panel which is responsive to said electrical signal.

6. The system according to claim 1, wherein said light source comprises a light emitting diode.

7. The system according to claim 1 further comprising a coupler for transferring and directing light energy among said light source, receptacle and decoder.

8. A system comprising:
   (a) a light source having means for providing light along a predetermined path;
   (b) a receptacle having a mouth with predetermined dimensions and a passageway having entrance and exit portions, said passageway located so as to intercept said light;
   (c) a device insertable into said receptacle comprising;
      (i) a carrier having an external portion with dimensions complementary to said mouth of said receptacle, and
      (ii) a fiber optic located in said carrier so as to intercept said light at said exit portion of said passageway, said fiber optic having a plurality of Bragg gratings that is arranged in series for intercepting said light and that reflects said intercepted light into a predetermined spectra pattern; and
   (d) a decoder having means for receiving and decoding said reflected predetermined spectra pattern and comparing and generating an electrical signal when said predetermined spectra pattern matches a preselected pattern.

9. A system comprising:
   (a) a light source having means for providing light along a predetermined path;
   (b) a receptacle having a mouth with predetermined dimensions and a passageway having entrance and exit portions, said passageway located so as to intercept said light;
   (c) a device insertable into said receptacle comprising;
      (i) a carrier having an external portion with dimensions complementary to said mouth of said receptacle, and
      (ii) a fiber optic located in said carrier so as to intercept said light at said exit portion of said passageway, said fiber optic having at least one reflective Bragg grating that reflects said intercepted light into a predetermined spectra pattern; and
   (d) a decoder having means for receiving and decoding said reflected predetermined spectra pattern and comparing and generating an electrical signal when said predetermined spectra pattern matches a preselected pattern, wherein said decoder comprises:
      (i) optics for receiving and focussing said reflected predetermined spectra pattern into a beam;
      (ii) diffraction grating optics arranged to intercept and allow said focussed reflected predetermined spectra pattern to pass therethrough as output signals thereof at predetermined angles;
      (iii) a linear detector array arranged to intercept said output signals of said diffraction grating and develop a corresponding binary output signal; and
      (iv) comparison means for comparing said binary output signal against said preselected pattern represented by binary bits and generating said electrical signal when said binary output signal matches said preselected pattern.

10. A system comprising:
   (a) a light source having means for providing light along a predetermined path;
   (b) a receptacle having a mouth with predetermined dimensions and a passageway having entrance and exit portions, said passageway located so as to intercept said light;

(c) a device insertable into said receptacle comprising;
  (i) a carrier having an external portion with dimensions complementary to said mouth of said receptacle, and
  (ii) a fiber optic located in said carrier so as to intercept said light at said exit portion of said passageway, said fiber optic having at least one reflective Bragg grating that reflects said intercepted light into a predetermined spectra pattern; and
(d) a decoder having means for receiving and decoding said reflected predetermined spectra pattern and comparing and generating an electrical signal when said predetermined spectra pattern matches a preselected pattern, wherein said decoder comprises:
  (i) an acoustooptic crystal arranged with an electroacoustic transducer responsive to an applied electrical signal for developing an acoustic wave, said acoustooptic crystal being further arranged to intercept but allow said reflected predetermined spectra pattern to find its way therethrough so as to interact with said acoustic wave and be diffracted with an angle determined by the product of the wavelength, having a corresponding frequency, of said predetermined spectra pattern and the frequency of said acoustic signal;
  (ii) means for sweeping the frequency of said predetermined spectra pattern and the frequency of said acoustic wave to produce a time varying signal serving as a binary output signal; and
  (iii) comparison means for comparing said binary output signal against said preselected pattern represented by binary bits and generating said electrical signal when said binary output signal matches said preselected pattern.

* * * * *